(12) United States Patent
Moore et al.

(10) Patent No.: US 8,775,351 B2
(45) Date of Patent: Jul. 8, 2014

(54) SYSTEM AND METHOD FOR PROVIDING RECOMMENDATIONS WITH A LOCATION-BASED SERVICE

(71) Applicant: Foursquare Labs, Inc., New York, NY (US)

(72) Inventors: Justin Moore, Brooklyn, NY (US); Noah Weiss, New York, NY (US); Benjamin N. Lee, Mountain View, CA (US); Max E. Sklar, New York, NY (US); Blake Shaw, New York, NY (US)

(73) Assignee: Foursquare Labs, Inc., New York, NY (US)

( * ) Notice: Subject to any disclaimer, the term of this patent is extended or adjusted under 35 U.S.C. 154(b) by 0 days.

(21) Appl. No.: 13/660,261

(22) Filed: Oct. 25, 2012

(65) Prior Publication Data

US 2013/0066821 A1    Mar. 14, 2013

Related U.S. Application Data

(63) Continuation of application No. 13/415,277, filed on Mar. 8, 2012, which is a continuation-in-part of application No. 13/408,150, filed on Feb. 29, 2012.

(60) Provisional application No. 61/450,616, filed on Mar. 8, 2011, provisional application No. 61/449,233, filed on Mar. 4, 2011.

(51) Int. Cl.
*G06F 17/00*    (2006.01)
*G06N 5/02*    (2006.01)

(52) U.S. Cl.
USPC ............................................. 706/46

(58) Field of Classification Search
USPC ............................................. 706/46
See application file for complete search history.

(56) References Cited

U.S. PATENT DOCUMENTS

| 6,282,516 | B1 | 8/2001 | Giuliani |
| 7,856,360 | B2 | 12/2010 | Kramer et al. |
| 8,150,844 | B2 | 4/2012 | Redstone et al. |
| 8,224,766 | B2 * | 7/2012 | Skibiski et al. ............ 706/55 |
| 8,295,855 | B2 | 10/2012 | Narayan et al. |
| 8,333,316 | B2 * | 12/2012 | Heath et al. ............ 235/375 |
| 8,355,987 | B2 | 1/2013 | Hirson et al. |

(Continued)

OTHER PUBLICATIONS

PCT/US2012/028248; PCT International Search Report; Jun. 20, 2012.

(Continued)

*Primary Examiner* — Michael B Holmes
(74) *Attorney, Agent, or Firm* — Lando & Anastasi LLP

(57) ABSTRACT

A mobile application is provided that provides intelligent recommendations based on the knowledge of where the user has been, and what venues the user would like to visit. Further, such an application may be capable of determining where people in a user's social network have been and what venue locations these related users would like to visit. Also, in another implementation, the application may be capable of determining where people with similar tastes have been, and where they would like to go. Some or all of this information may be used by a mobile application that provides recommendations to a user. For instance, in one implementation, a user having a mobile device such as a cell phone wishes to locate a venue based on one or more parameters, and some or all of this information may be used to order or rank recommendations within the interface.

46 Claims, 9 Drawing Sheets

(56) References Cited

U.S. PATENT DOCUMENTS

| | | |
|---|---|---|
| 8,447,760 B1 * | 5/2013 | Tong et al. .................... 707/728 |
| 8,620,624 B2 * | 12/2013 | Skibiski et al. ............... 702/188 |
| 8,626,918 B2 * | 1/2014 | Moore et al. .................. 709/226 |
| 2002/0002485 A1 | 1/2002 | O'Brien et al. |
| 2003/0182191 A1 | 9/2003 | Oliver et al. |
| 2006/0178932 A1 | 8/2006 | Lang |
| 2007/0005419 A1 | 1/2007 | Horvitz et al. |
| 2007/0192182 A1 | 8/2007 | Monaco et al. |
| 2008/0065774 A1 | 3/2008 | Keeler |
| 2008/0306826 A1 | 12/2008 | Kramer et al. |
| 2009/0005077 A1 | 1/2009 | Forstall et al. |
| 2009/0024477 A1 | 1/2009 | Kramer et al. |
| 2009/0076925 A1 | 3/2009 | DeWitt et al. |
| 2009/0102859 A1 | 4/2009 | Athsani et al. |
| 2009/0123004 A1 | 5/2009 | Otto et al. |
| 2009/0259547 A1 | 10/2009 | Clopp |
| 2010/0076951 A1 | 3/2010 | Lyle et al. |
| 2010/0130223 A1 | 5/2010 | Liao et al. |
| 2010/0138443 A1 | 6/2010 | Ramakrishnan et al. |
| 2010/0144367 A1 | 6/2010 | Goh et al. |
| 2010/0153292 A1 | 6/2010 | Zheng et al. |
| 2010/0211308 A1 | 8/2010 | Zheng et al. |
| 2010/0318407 A1 | 12/2010 | Leff et al. |
| 2010/0332324 A1 | 12/2010 | Khosravy et al. |
| 2011/0087538 A1 | 4/2011 | Bous et al. |
| 2011/0093340 A1 | 4/2011 | Kramer et al. |
| 2011/0276478 A1 | 11/2011 | Hirson et al. |
| 2011/0313826 A1 | 12/2011 | Keen et al. |
| 2012/0047129 A1 | 2/2012 | Redstone et al. |
| 2012/0197696 A1 | 8/2012 | Beyeler et al. |
| 2012/0197709 A1 | 8/2012 | Kendall et al. |
| 2012/0197724 A1 | 8/2012 | Kendall |
| 2012/0203604 A1 | 8/2012 | Baker et al. |
| 2012/0233158 A1 | 9/2012 | Braginsky et al. |
| 2012/0245985 A1 | 9/2012 | Cho et al. |
| 2013/0097022 A1 * | 4/2013 | Horvitz et al. ............. 705/14.58 |

OTHER PUBLICATIONS

ISR-PCTUS2012027125 Aug. 7, 2012.

* cited by examiner

SYSTEM AND METHOD FOR PROVIDING RECOMMENDATIONS WITH A LOCATION-BASED SERVICE

RELATED APPLICATIONS

This application is a Continuation of U.S. application Ser. No. 13/415,277, entitled "SYSTEM AND METHOD FOR PROVIDING RECOMMENDATIONS BY A LOCATION-BASED SERVICE," filed on Mar. 8, 2012, which claims priority under 35 U.S.C. §119(e) to U.S. Provisional Patent Application Ser. No. 61/450,616, entitled "SYSTEM AND METHOD FOR PROVIDING RECOMMENDATIONS WITH A LOCATION-BASED SERVICE," filed on Mar. 8, 2011, which applications are herein incorporated by reference by their entirety. U.S. application Ser. No. 13/415,277 is also a continuation-in-part of U.S. application Ser. No. 13/408,150, entitled "SYSTEM AND METHOD FOR MANAGING AND REDEEMING OFFERS WITH A LOCATION-BASED SERVICE" filed on Feb. 29, 2012, which claims priority under 35 U.S.C. §119(e) to U.S. Provisional Patent Application Ser. No. 61/449,233, entitled "SYSTEM AND METHOD FOR MANAGING AND REDEEMING OFFERS WITH A LOCATION-BASED SERVICE," filed on Mar. 4, 2011, all of which applications are herein incorporated by reference by their entirety.

BACKGROUND

There are many location-based systems in use today. In particular, location-based services such as the Foursquare system (available on the Internet at http://www.foursquare.com) permit users to verify their locations using one or more computer systems. Some services permit users to use their locations for the purpose of interacting within a social network. For instance, within one type of location-based social network, users are permitted to perform a "check-in" to particular locations, including venues such as businesses, retail locations, points of interest, or other locations. A check-in generally includes a process that identifies a user with a particular venue location at a given time, and such check-ins may be recorded over time (e.g., by a location-based social network). Such location-based social networks also permit users to interact with friends, find venues of interest, leave comments regarding particular venues, among other functions.

SUMMARY

It is appreciated that there is a need to provide more accurate and relevant recommendations by a location-based service. In one aspect of the present invention, it is desired that a mobile application be provided that provides intelligent recommendations based on the knowledge of where the user has been, and where the user would like to go. Further, such an application may be capable of determining where your friends have been and where they would like to go. Also, in another implementation, the application may be capable of determining where people with similar tastes have been, and where they would like to go. Some or all of this information may be used by a mobile application that provides recommendations to a user. For instance, in one implementation, a user having a mobile device such as a cell phone wishes to locate a venue (e.g., a restaurant or other business) based on one or more parameters, and some or all of this information may be used to order or rank recommendations within the interface of the mobile device.

It may be useful and particularly advantageous to provide recommendations using location-based services. Although locating venues based on location of a user using location-based services is known, it would be beneficial to provide higher quality recommendations to users (e.g., potential customers) using a location-based service. It is appreciated that the user benefits by having higher quality recommendations provided, and will therefore be more likely to use the location-based service. Further, because the quality of recommendations, according to one embodiment, are driven by the user interacting with the location-based service, the user will be more likely to interact with the location-based service in the future.

According to one embodiment, information associated with the user is used to determine recommendations. In one example, venue locations where the user has previously visited may influence what recommendations may be listed for a user. For instance, a location-based service may store information for each particular user, including preference information identifying preferences of particular venues the user has visited (e.g., "tips"). Further, the location-based service may store preferences for venues that the user has not yet visited (e.g., "to do" information).

In another embodiment, information associated with other users in the location-based system may be used to provide recommendations at a user. For instance, for users that are the current users "friends," information regarding what venues those users have visited, their preferences for particular venues, and preferences for venues that they have not visited may be used to influence what recommendations may be displayed to the current user. Other users not in the current user's network may also be used to determine what recommendations are displayed. For instance, certain recommendations may be determined as more popular and/or have higher quality ratings as determined by other users, specific groups of users, or the entire network itself.

A user interface may be provided that allows a user to more quickly locate desired venues. Also, because interfaces on mobile devices can display limited results, it is appreciated that the quality of recommendations within the display is important. An interface, according to one embodiment, may include an ordered list of recommendations (e.g., responsive to a query including one or more parameters such as keywords, distance, category, etc.), and this list of recommendations may be ordered based on one or more of the information items described above. According to one embodiment, the list may be adjusted according to personal information (e.g., information recorded regarding the current user's preferences and/or history), social network information (e.g., information recorded regarding the current user's friends), and/or popularity of the items themselves (e.g., as determined by group(s) of users and/or the entire network).

According to one embodiment, a search engine associated with a location-based service may provide recommendation information based on one or more inputs provided by a user (e.g., via an interface of a mobile device). For instance, a user may be located at a particular location and that user decides he/she would like to purchase food. That user may also provide more specific information (e.g., the keyword "that") although the user could be less specific and just specify a category such as "food." In one implementation, the user may select a control on the mobile device (e.g., a button) that specifies the category "food" or lists a number of categories of interest (e.g., in a menu structure). In the example above, the user may not want to travel past a certain distance, so the interface may permit the user to enter a distance limitation to the search along with the user's current location. The search engine may use any parameters provided by the user and the system (e.g., location of the user in latitude/longitude, altitude, etc.) to determine a list of recommendations.

According to one embodiment, a ranking component may use the query results to determine a ranking of the venue locations based on one or more elements. For instance, for every venue that satisfies the original search criteria, a score may be determined based on one or more parameters. As discussed above, the list may be adjusted according to personal information, social network information, and/or popularity of the items themselves.

In one example implementation, a ranking may be provided that evaluates a particular venue (e.g., one that was returned from the query results), evaluate every venue the user has been within the location-based service (e.g., locations in which the user has "checked in") and approximate the user's rating for that particular venue. According to one embodiment, venue information may be scored using one or more functions that determine the user's preference for a particular venue. For instance, collaborative filtering functions, item-item correlation, k-nearest neighbors, or other functions may be used to determine a user's preference. Generally, such functions have been used to predict a user's affinity for certain products (e.g., movies, web pages, consumer products). However, it is appreciated that venue preferences may be predicted using such functions in a location-based service based on where the user has previously been, preferences of people in their social network, and/or preferences of the certain groups or the entire network of location-based service users.

In one example, for each venue, a system is provided that evaluates every venue (e.g., meeting the query criteria provided) where the user has previously been and approximates the user's rating of each venue using one or more functions (e.g., collaborative filtering, item-item, k-nearest neighbors, etc.). For each venue, the system may also determine if people in the user's social network (e.g., friends) have been to the venue, if so, the system may provide an approximation of the user's rating based on how much the user's social network rated the venue, visited the venue, or had an effect on any other parameter or combination thereof relating to the venue (e.g., as determined via collaborative filtering, user-user, k-nearest neighbors functions). Further, the system may determine, as a baseline measurement, how popular this particular venue is within the location-based system. These measurements may be adjusted by other factors (e.g., the probability that a user will perform a "check-in" at this venue at a particular time of day, day of week, etc.).

In one specific implementation, each venue has multiple scores associated with it, two approximations based on functions, baseline popularity as discussed above, and additional information such as preference information for venues already visited (e.g., "tips" to other users) and preferences for venues that the user has not yet visited (e.g., "to do" information). These scores may be added up for each venue, and the score may be adjusted for other factors (e.g., adjusted by the probability that the venue is open or being frequented now) and a per venue score may be determined. The output list of venues based on the original query may be ranked in the order of these final venue scores. A predetermined number of top scores may be provided to the user as recommendations. Such a list may be displayed within an interface of a mobile device associated with the user. Further, any justifications for particular rankings of recommendations may be provided to the user within the interface (e.g., "Your friend John recommended this restaurant.") to permit the user to make a more informed choice of venue.

According to another aspect, it is appreciated that a location-based service may assist with providing recommendations to a user. For instance, a location-based service may be used to store and manage recommendations for venue locations. Such recommendation information may be provided directly to users or one or more third party applications and/or systems. In one embodiment, a programmatic interface may be provided that allows third party applications to receive recommendations from the location-based service.

According to another aspect, it is appreciated that higher quality venues are desired for presentation to users. In one embodiment, it is appreciated that higher quality venues are contained by more lists of venues of more influential users of the location-based service than "average" venues. In one embodiment of a location-based service, users may be permitted to create one or more lists of venues that can be shared with other users. As discussed, it is desired that a signal indicative of the best venues would be helpful in the creation and display of a list to a user (e.g., particularly one of a location-based service that has limited display capability and/or needs to provide a limited number of recommendations). Thus, a method of ranking may be desired that provides a high-precision ranking of the "best" venues, but not necessarily a ranking of all venues, which might be typically returned in an Internet search.

To this end, it is appreciated that users of the location-based service that "follow" one or more lists of venues (e.g., in a particular geographic area, venue type, category of venue, or other parameter used to group venues) may provide better signals of what venues should be more highly ranked. For instance, a score or other type of ranking may be determined for a venue that determines how popular that venue is with "experts" in a particular category or other grouping of venues. In another example, a score or other type of ranking may be determined for a venue that identifies the number and/or quality of lists that contain this venue. For instance, the number of lists in which a venue appears may be determined and may be indicative of how good a venue is.

Also, in another example, there may be comparative rankings of lists that can be used to determine a ranking of a particular venue that is associated with the list. For instance, if a particular venue is highly ranked on a popular list, that venue may be ranked or scored relative to the list's popularity. In yet another example, tips associated with each venue that are left by users may be analyzed and scored for each venue. In one example, text associated with the tips themselves may be analyzed for particular keywords and scored depending on the types and number of keywords present. One advantage associated with some of these types of rankings discussed above is that they may be based on the analysis of users in general and are not dependent on one user's ranking or preferences. For instance, it may be beneficial in a location-based system to aggregate the responses of multiple users into a score for a particular venue, and that score may be used to rank venues within a recommendation interface presented to other users. Such a score may be determined using one or more of the scores determined based on any of the score types discussed above.

According to another aspect of the present invention, a location-based system may determine an adjustable boundary of a geographical area in which to search for venues based on a query (e.g., a query provided by a user within an interface of a mobile device). According to one embodiment, the boundary of search may be adjusted based on the density of venues within a particular area. For instance, from a particular geographic point, a radius from the geographic point may be adjusted to achieve a particular venue density within a circular area. Although a circle may be used, other boundary types and shapes may be used (e.g., square, rectangle, displayed map area, town, or similar boundary).

In another embodiment, the adjustable boundary may be determined based on a distance between subsequent "check-ins" in an area performed by users in that particular area in relation to some time. For instance, a determination may be made by the location-based system that a user checked in a certain distance from one check-in point (e.g., a first venue) to a second check-in point (e.g., a second venue). In one implementation, an average distance between check-ins (e.g., performed by one user, all users) may be used as an input to determine an adjustment of an adjustable boundary used for executing a search query for venue locations. According to one aspect, it is appreciated that the check-in history may be used as an indicator of the activity density within a particular region. In one implementation, check-in history may be used to determine a default or adjustable setting for performing a search query (e.g., as a setting in a location-based application operated by a user).

According to another aspect, it is appreciated that a time between check-ins performed with a particular venue or a time between check-ins performed by a particular user may be used by a location-based service to determine rankings of one or more venue locations. For instance, if two check-ins to a particular venue occur weeks apart, this sequence is less relevant than two check-ins that occur an hour or two apart. Further, in another example, time between check-ins may be used as a parameter to determine check-in density, which could be also used to determine an adjustable boundary for venue search.

According to one aspect of the present invention, a method for providing recommendations by a location-based service is provided. The method comprises acts of receiving, within an interface of a mobile device associated with a user, an input defining a query for a recommendation of one or more venue locations by the location-based service, determining, by the location-based service, a location of the mobile device, determining, a result set of venue locations based on the provided query, ordering, within the interface of the mobile device, a plurality of the venue locations of the result set based on at least one or more of a group of venue information comprising personal information associated with the user, the personal information relating to one or more of the plurality of venue locations, social network information relating to the one or more of the plurality of venue locations, and popularity information that identifies a popularity of the one or more of the plurality of venue locations as determined by a set of users defined in the location-based service. According to one embodiment of the present invention, the method further comprises an act of determining, for each of the venue locations in the result set, a respective score based on at least one or more of the group of venue information. According to another embodiment of the invention, the method further comprises an act of presenting, to the user in a display of the mobile device associated with the user, an input control in which the user provides one or more keywords. According to another embodiment of the invention, the method further comprises an act of presenting, to the user in a display of the mobile device associated with the user, an input control that permits the user to select a category of venues. According to another embodiment of the invention, the method further comprises an act of providing the user a control that permits the user to select a limitation of a distance from a current location of the user where recommendations will be provided.

According to one embodiment of the present invention, the personal information relating to one or more of the plurality of venue locations comprises preference information for venues already visited by the user. According to another embodiment of the invention, the personal information relating to one or more of the plurality of venue locations comprises preference information for venues not yet visited by the user. According to another embodiment of the invention, the social network information relating to the one or more of the plurality of venue locations comprises preference information for venues already visited by one or more users in the social network. According to another embodiment of the invention, the method further comprises an act of determining a popularity measure of the one or more of the plurality of venue locations as determined by the set of users defined in the location-based service. According to another embodiment of the invention, the act of determining, for each of the venue locations in the result set, the respective score based on the at least one or more of the group of venue information further comprises acts of determining respective scores for each venue location in the result set based on more than one of the personal information, the social network information, and the popularity information. According to another embodiment of the invention, the method further comprises determining scores for each venue location based on the personal information, the social network information, and the popularity information and combining the scores to produce a total score for each venue location. According to another embodiment of the invention, the method further comprises an act of using a collaborative filtering function for determining the score of each venue locations in the result set using at least one or more of the group of venue information.

According to one embodiment of the present invention, the method further comprises an act of using a user-user filtering function for determining the score of each venue locations in the result set using at least one or more of the group of venue information. According to another embodiment of the invention, the method further comprises an act of using a k-nearest neighbors filtering function for determining the score of each venue locations in the result set using at least one or more of the group of venue information. According to another embodiment of the invention, the method further comprises an act of adjusting the respective score for at least one of the venue locations in the result set responsive to one or more factors relating to the at least one of the venue locations. According to another embodiment of the invention, the one or more factors includes at least one of a probability that the at least one of the venue locations is currently open and information identifying that the at least one of the venue locations is currently being frequented. According to another embodiment of the invention, the act of ordering the plurality of venue locations is responsive to a determination of popularity of each of the plurality of venue locations, the determination of popularity for a respective one of the plurality of venue locations being based on whether the respective one venue appears on a list of venues.

According to one embodiment of the invention, the act of ordering the plurality of venue locations is responsive to a determination of popularity of each of the plurality of venue locations, the determination of popularity for a respective one of the plurality of venue locations being based on how popular the respective one venue is with one or more experts. According to another embodiment of the invention, the method further comprises an act of determining the one or more experts based on their activity within the location-based service. According to another embodiment of the invention, the act of ordering the plurality of venue locations is responsive to a determination of sentiment of each of the plurality of venue locations. According to another embodiment of the invention, the determination of sentiment comprises an act of determining, for at least one venue of the plurality of venue locations, an indication of sentiment based on review information provided by users for the at least one venue to the location-based service. According to another embodiment of the invention, the method further comprises an act of limiting the result set of venue locations responsive to a determination of densities of venues in a particular area. According to another embodiment of the invention, the method further comprises an act of limiting the result set of venue locations responsive to a determination of a distance between subsequent check-ins in a particular area. According to another embodiment of the invention, the method further comprises an act of determining the distance between subsequent check-ins for a plurality of users within the particular area.

According to one aspect of the present invention, a system for providing recommendations in a distributed communications network is provided. The system comprises a location-based service including a distributed computer system having at least one processor and a memory, an interface adapted to receive an input from a mobile device defining a query for a recommendation of one or more venue locations by the location-based service, a component for determining, by the location-based service, a location of the mobile device, a component adapted to determine a result set of venue locations based on the provided query, a component adapted to order, within the interface of the mobile device, a plurality of the venue locations of the result set based on at least one or more of a group of venue information comprising personal information associated with the user, the personal information relating to one or more of the plurality of venue locations, social network information relating to the one or more of the plurality of venue locations, and popularity information that identifies a popularity of the one or more of the plurality of venue locations as determined by a set of users defined in the location-based service. According to one embodiment of the present invention, the system further comprises a component adapted to determine, for each of the venue locations in the result set, a respective score based on at least one or more of the group of venue information. According to another embodiment of the invention, the system further comprises a component adapted to present, to the user in a display of the mobile device associated with the user, an input control in which the user provides one or more keywords. According to another embodiment of the invention, the system further comprises a component adapted to present, to the user in a display of the mobile device associated with the user, an input control that permits the user to select a category of venues.

According to another embodiment of the invention, the system further comprises a control that permits the user to select a limitation of a distance from a current location of the user where recommendations will be provided. According to another embodiment of the invention, the personal information relating to one or more of the plurality of venue locations comprises preference information for venues already visited by the user. According to another embodiment of the invention, the personal information relating to one or more of the plurality of venue locations comprises preference information for venues not yet visited by the user. According to another embodiment of the invention, the social network information relating to the one or more of the plurality of venue locations comprises preference information for venues already visited by one or more users in the social network. According to another embodiment of the invention, the system further comprises a component adapted to determine a popularity measure of the one or more of the plurality of venue locations as determined by the set of users defined in the location-based service. According to another embodiment of the invention, the component that is adapted to determine, for each of the venue locations in the result set, the respective score based on the at least one or more of the group of venue information further comprises a component adapted to determine respective scores for each venue location in the result set based on more than one of the personal information, the social network information, and the popularity information.

According to one embodiment of the present invention, the system further comprises a component adapted to determine scores for each venue location based on the personal information, the social network information, and the popularity information and combining the scores to produce a total score for each venue location. According to another embodiment of the invention, the system further comprises a component adapted to perform a collaborative filtering function for determining the score of each venue locations in the result set using at least one or more of the group of venue information. According to another embodiment of the invention, the system further comprises a component adapted to perform a user-user filtering function for determining the score of each venue locations in the result set using at least one or more of the group of venue information. According to another embodiment of the invention, the system further comprises a component adapted to perform a k-nearest neighbors filtering function for determining the score of each venue locations in the result set using at least one or more of the group of venue information. According to another embodiment of the invention, the system further comprises a component adapted to adjust the respective score for at least one of the venue locations in the result set responsive to one or more factors relating to the at least one of the venue locations. According to another embodiment of the invention, the one of more factors includes at least one of a probability that the at least one of the venue locations is currently open and information identifying that the at least one of the venue locations is currently being frequented.

According to one embodiment of the present invention, the component adapted to order the plurality of venue locations is responsive to a component adapted to determine a popularity of each of the plurality of venue locations, the popularity for a respective one of the plurality of venue locations being based on whether the respective one venue appears on a list of venues. According to another embodiment of the invention, the component adapted to order the plurality of venue locations is responsive to a component adapted to determine a popularity of each of the plurality of venue locations, the popularity for a respective one of the plurality of venue locations being based on how popular the respective one venue is with one or more experts. According to another embodiment of the invention, the system further comprises a component adapted to determine the one or more experts based on their activity within the location-based service. According to another embodiment of the invention, the component adapted to order the plurality of venue locations is responsive to a component adapted to determine sentiment of at least one of the plurality of venue locations. According to another embodiment of the invention, the component adapted to determine sentiment comprises a component adapted to determine, for at least one venue of the plurality of venue locations, an indication of sentiment based on review information provided by users for the at least one venue to the location-based service.

According to one embodiment of the invention, the system further comprises a component adapted to limit the result set of venue locations responsive to a determination of densities of venues in a particular area. According to another embodiment of the invention, the system further comprises a component adapted to limit the result set of venue locations responsive to a determination of a distance between subsequent check-ins in a particular area. According to another embodiment of the invention, the system further comprises a component adapted to determine the distance between subsequent check-ins for a plurality of users within the particular area.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1:
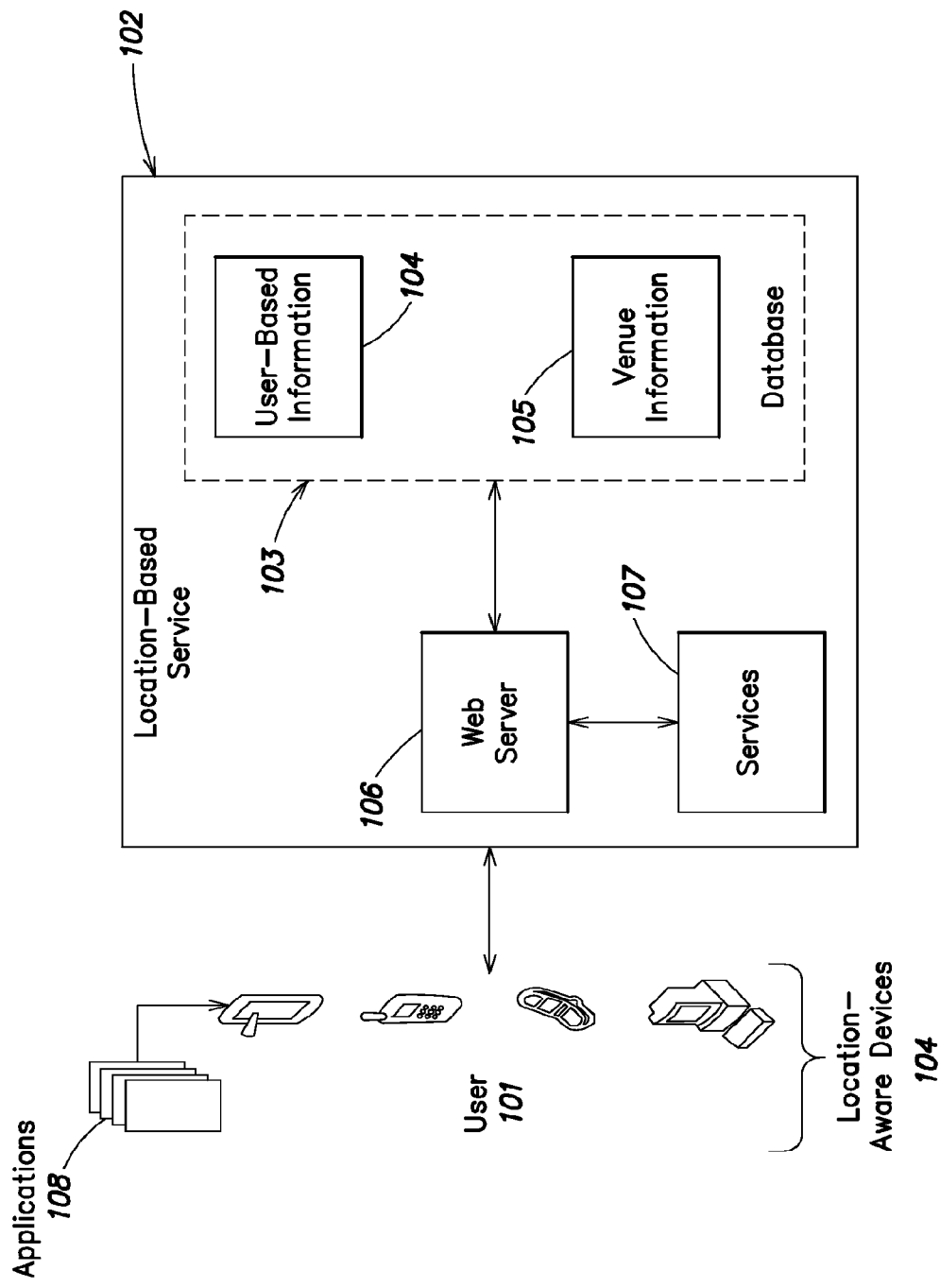
FIG. 1 is a block diagram showing a location-based service and system suitable for incorporating various aspects of the present invention.

FIG. 1 shows a block diagram of a location-based service and system suitable for incorporating various aspects of the present invention. For instance, a location-based service 102 may permit one or more users (e.g., user 101) to interact with one or more other users, systems and services based on their location. To this end, the user's location may be determined using one or more location-aware devices (e.g., devices 104), such as, for example, a cell phone, smart phone, PDA, tablet computer, laptop or other system, and location-based service may provide one or more recommendations for the user based on their location. Users may use an interface of the location-aware device for interacting with the system to receive recommendations for certain venue locations. These recommendations may be provided responsive to one or more inputs a user might provide within the interface of the mobile device, such as a query formed by one or more keywords, selection of particular search categories (e.g., "Food", "Nightlife", etc.), distance from the user's current location, or other parameters, either alone or in any combination.

In one embodiment, service 102 may include one or more components. Such components may be implemented using one or more computer systems. In one embodiment, location based service 102 may be implemented on a distributed computer system using one or more communication networks (e.g., the Internet). In one implementation, the service is implemented in a cloud-based computing platform, such as the well-known EC2 platform available commercially from Amazon.com, Seattle, Wash. Other implementations are possible and are within the scope and spirit of the invention, and it is appreciated that other platforms may be used.

Service 102 may include a web server 106 which is capable of serving as a front end to the location-based service 102. Devices may communicate and display data provided by service 106 to the user (e.g., user 101). Notably, devices may include controls that perform various functions in a location-based application (such as one or more of application(s) 108), such as viewing venues proximate to the user's location, reviewing information regarding proximate venues left by other users, communicating with other users, among other functions. Further, such devices may provide the location of the user to the location-based service 102, and this location information may be used to perform one or more functions.

Service 102 may also provide one or more related services (e.g., services 107), such as a service for recommending venues, storing pictures based on location, location-based games, or other service that utilizes location information relating to its users. Services 107 may be integral to location-based service 102 or many alternatively operate in conjunction with location-based service 102, (e.g., by communicating with the location-based service through an Application Programming Interface (API)). Notably, according to one aspect of the present invention, recommendations for particular venue locations defined within service 102 may be provided to a user.

Service 102 may also be capable of storing information in one or more databases (e.g., database 103). For instance, service 102 may be configured to store user-based information (e.g., user-based information 104) such as a user identification, identifications of friends associated with the user identification, any history information such as locations visited, preference information for particular venue locations, notes regarding venue locations visited, among other user-related information. Service 102 may also be capable of storing venue information (e.g., venue information 105) that may include, for example, location information (e.g., address, latitude, longitude, altitude, etc.), contact information, venue description, among other information. Venue information may also include, according to one embodiment, preference information for the particular venue.

One commercially-available system that may be suitable for implementing various aspects of the present invention may include the Foursquare service, available at http://www.foursquare.com and provided by Foursquare Labs, Inc., New York. Other systems capable of providing location-based services are available and are capable of implementing various aspects of the present invention.

Figure 2:
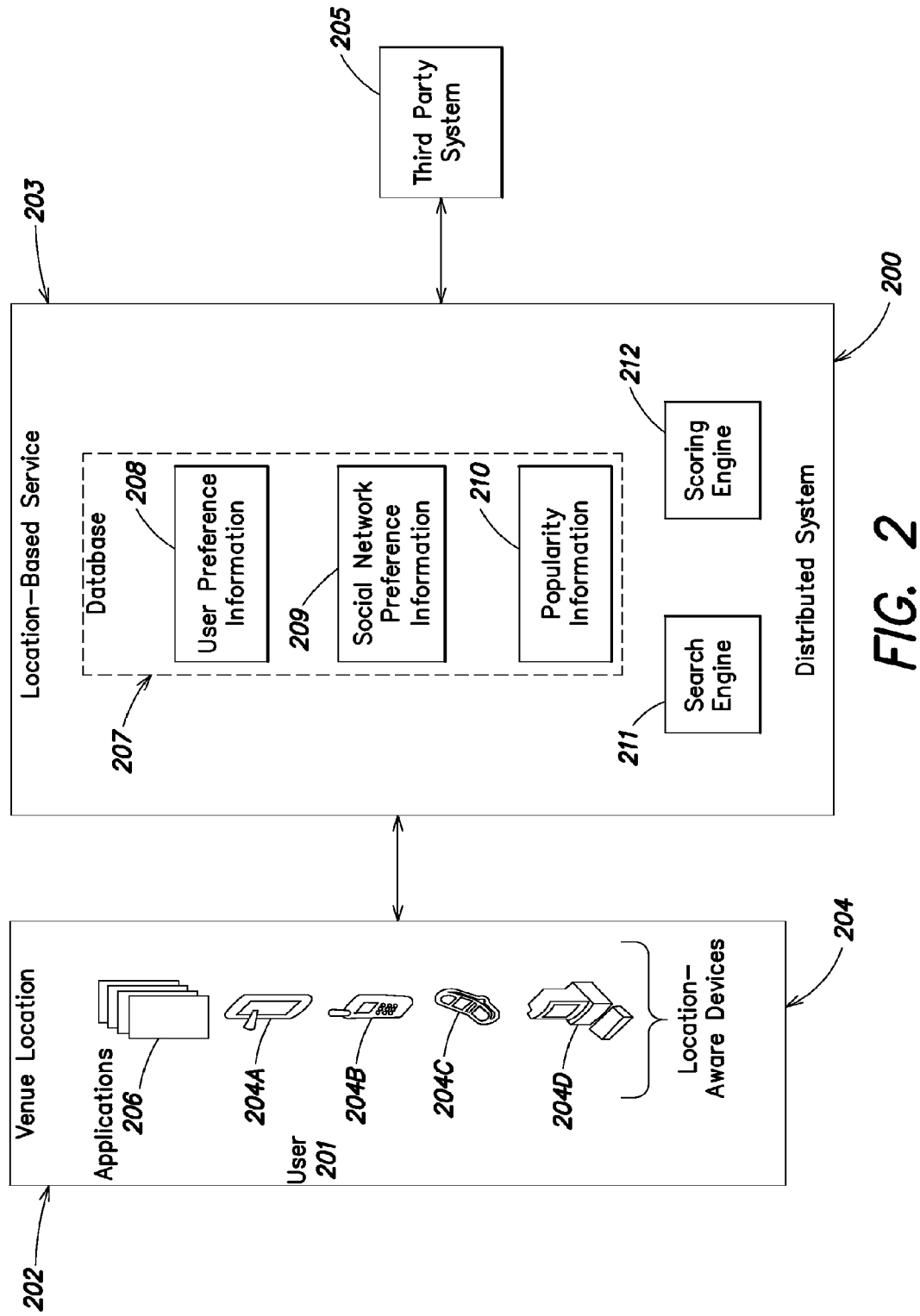
FIG. 2 shows a block diagram of a distributed system suitable for performing various aspects of the present invention.

FIG. 2 shows a system incorporating various aspects of the present invention. In particular, a distributed computer system (e.g., system 200) may be provided that is capable of providing recommendations in association with a location-based system (e.g., system 203). Such recommendations may be provided to one or more users. Further, such recommendations may be provided to other systems and/or applications that work integrally with location-based service 203. For instance, a third party system (e.g., system 205) may be capable of receiving recommendations for one or more venue locations from the location-based system.

Such recommendations may be presented to users (e.g., user 201) at or near one or more venue locations (e.g., venue location 202) on one or more location-aware devices (e.g., device 204). For instance, recommendations may be presented and viewed using one or more applications 206 that execute on a location-aware device. Device 204 may be any device, system, or item that can be used to locate a user, including a tablet computer (element 204A), smartphone (element 204B), cell phone (204C), personal computer (element 204D), or other system type.

Location-based service 203 may include, for example, a search engine 211 that receives search information from one or more applications 206, and provides recommendations to a location-aware device for display to the user. Search engine 211 may be capable of accepting one or more parameters such as keywords, distance settings, among others, from the location-aware device and provide a list of venues that satisfy the provided parameters. Search engine 211 or any other separate process or element may be capable of ordering and/or ranking the search results based on one or more sets of information stored in a database of the location-based service.

For instance, a database 207 may be provided (either separate or the same as database 203) that stores user preference information (e.g., information 208) relating to venues stored by the location-based service. Such information may include, for example, a history of venues the user has previously visited and their rating of such venues. User preference information may also include preference information for venues that the user has not yet visited. Database 207 may also store social network preference information (e.g., information 209) relating to venues stored by the location-based service. For instance, for users defined within the location-based service or are defined in other social networking applications that are indicated as the current users "friends," information regarding what venues those users have visited, their preferences for particular venues, and preferences for venues that they have not visited may be used to influence what recommendations may be displayed to the current user.

Further, database 207 may store popularity information (e.g., information 210) relating to venues defined in the location-based service. For instance, other users not within the current user's social network may also be used to determine what recommendations are displayed. For instance, certain venues may be determined as more popular and/or have higher quality ratings as determined by other users, specific groups of users, or the entire network itself.

In one embodiment, the user "checks-in" to the location-based service using an application executing on the mobile device, and responsive to the user "checking-in," that user is permitted to search for recommendations within the location-based service. Such recommendations may be ordered relative to a location of the venue where the user "checked in" or where the user is otherwise located. For example, as discussed above, a user's location may be determined by a location-aware device. In certain embodiments, the user may be permitted to check in using a number of different applications (e.g., Check-in4Me, 4squareSMS, Foursquare, etc.) into the same location-based service or from another location-based service that shares location and check-in information regarding users. In one implementation, application providers may be permitted to receive recommendations from the location-based service for display to their users. Some applications that do not provide check-in services may still be capable of receiving recommendation information from the location-based service.

Figure 3:
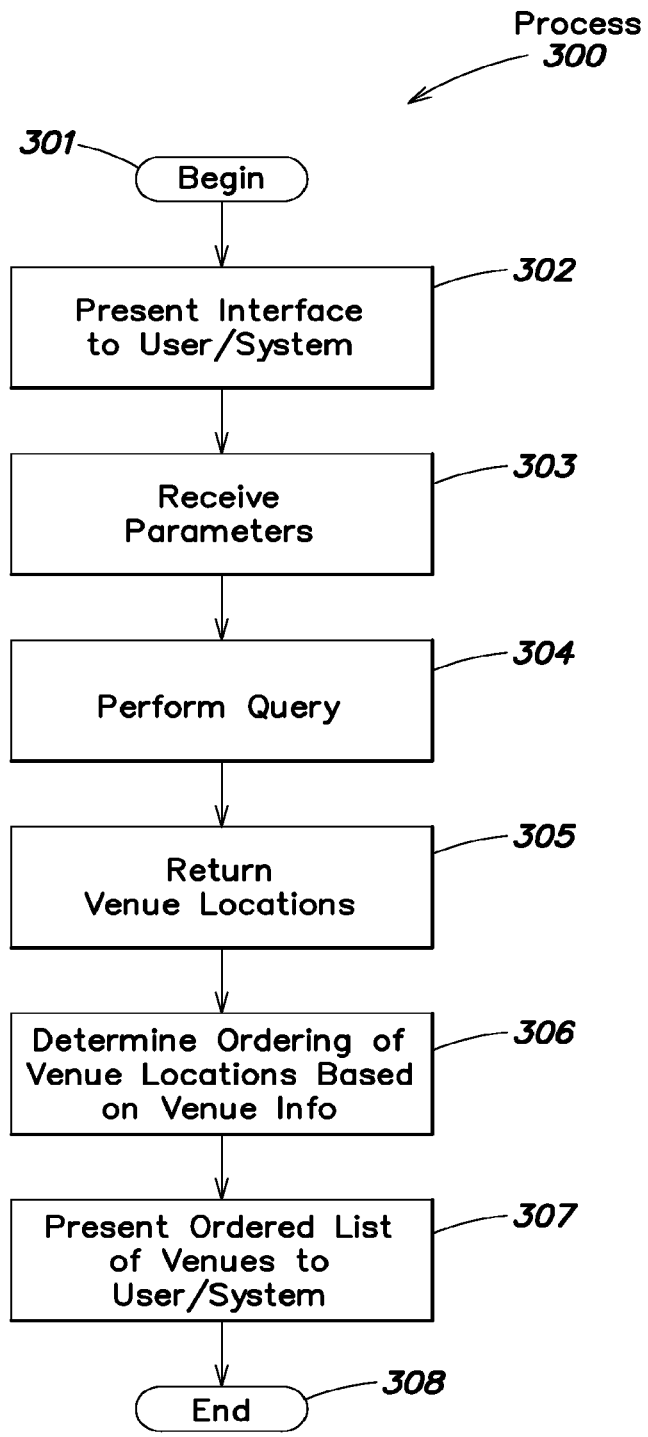
FIG. 3 is a block diagram showing an example process for providing recommendations in a system that uses location-based services.

FIG. 3 shows an example process (e.g., process 300) for providing recommendations in a location-based service in accordance with one embodiment. At block 301, process 300 begins. At block 302, a website, other application (e.g., a location-aware application executing on the mobile device) may be displayed to the user. Alternatively, an interface such as an API may be provided to an application for the purpose of providing recommendations to another application or system.

At block 303, the location-based system may receive one or more parameters requesting a search for recommendations. Such information may be provided via one or more interfaces, such as receiving the parameters in an interface of a mobile device, the parameters being provided by a user within a search function performed on the mobile device. Also, the parameters may be received from a third party application or system that utilizes location-based services. Such parameters may include, for example, one or more keywords, distance, the current location of the user, one or more categories that limit the search results, an indication of what type of search performed (e.g. one based on user parameters, social network parameters, popularity within the overall location-based service, or combination of these types), among other parameters, either alone or in combination with other parameters.

At block 304, a component within the location-based service (e.g., a search engine such as search engine 211) may perform a search of stored venues matching some or all of the parameters provided. Such a search may be performed, for example, using venue information stored in database 207. At block 305, an output list or set of venue locations may be returned.

At block 306, a component within the location-based service (e.g., a scoring engine such as scoring engine 212) may determine an ordering of output venues that were provided by the query. In one embodiment, the ordering may be based on the venue information that is collected by the location-based service. As discussed, venue information that can be used to determine a ranking or order of venues may include user preference information, social network preference information, and/or popularity information. Scores may be computed for each venue, and ranking may be determined based on the computed scores. At block 307, an ordered list of venues may be provided to the user, application, other system, or other entity. At block 308, process 300 ends.

Figure 4:
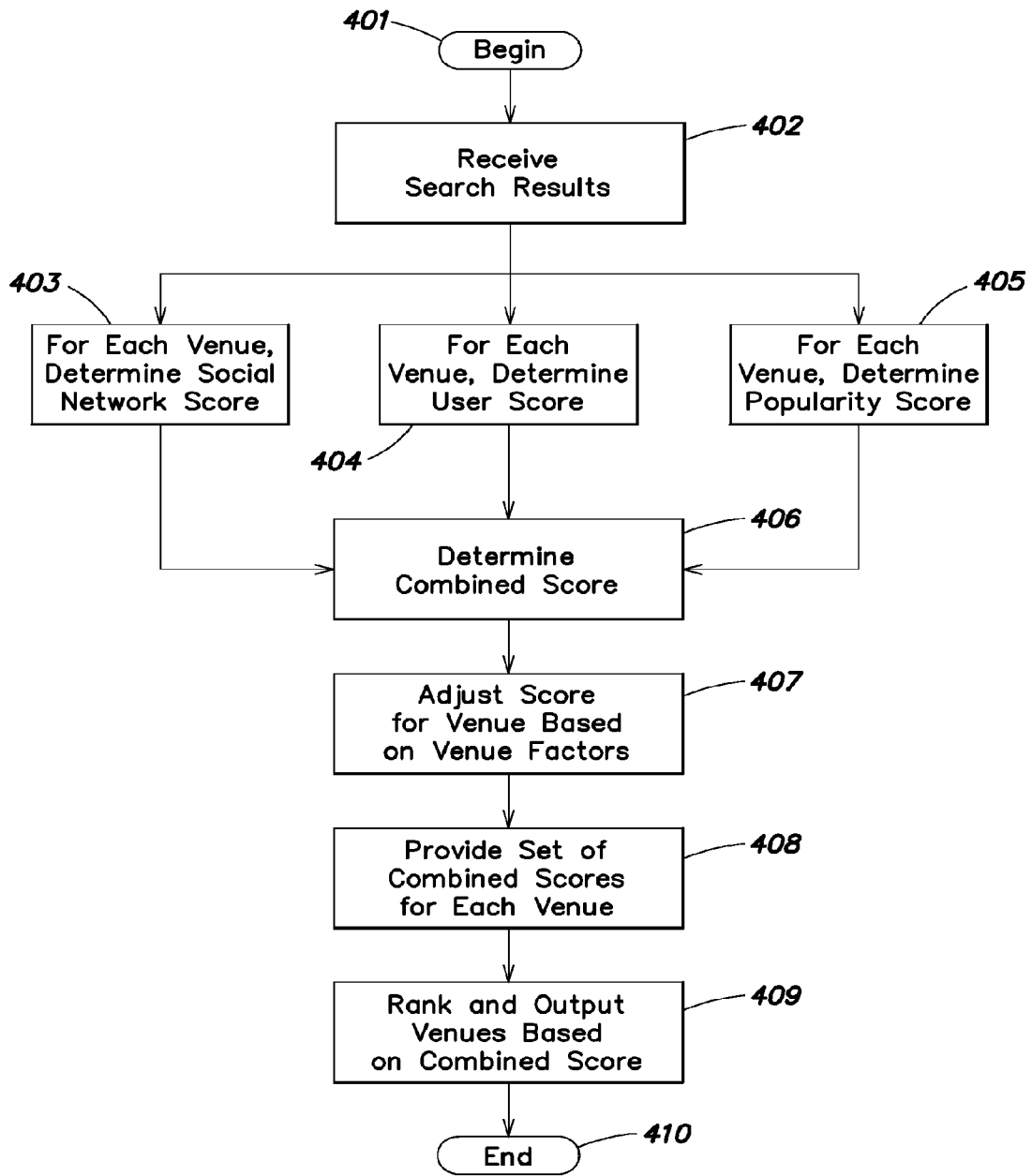
FIG. 4 is a block diagram showing an example process for scoring venue locations using a location-based service according to one embodiment of the present invention.

FIG. 4 shows an example process (e.g., process 400) for scoring venues in a location-based service in accordance with one embodiment. At block 401, process 400 begins. At block 402, a component of the location-based service (e.g., a scoring engine 212) receives search results which may include a set of venues defined in the location-based service. At block 404, for each venue within the result set, a user score may be determined based on user preferences as discussed above. In one embodiment, one or more functions such as collaborative filtering, user-user, k-nearest neighbors functions, or others may be used to determine a user score for a particular venue. In one embodiment, this function may be performed based on information stored by the location-based service indicating whether the user has previously been to this or similar venues. Further, this function may be performed based on information stored by the location-based service indicating that the user intends to go to this venue or similar venues.

At block 403, for each venue within the result set, a social network score may be determined based on social network preferences as discussed above. In one embodiment, one or more functions such as collaborative filtering, user-user, k-nearest neighbors functions, or others may be used to determine a social network score for a particular venue. In one embodiment, this function may be performed based on information stored by the location-based service indicating whether users within the specified user's social network has previously been to this or similar venues, and/or intends to go to this venue or similar venues.

At block 405, for each venue within the result set, a popularity score may be determined based on the popularity of the venue within the location-based service as discussed above. The popularity of the venue may be determined by the entire history of user preferences, some weighted function of preferences, a subset of particular users (e.g., users determined to be similar to the current user), or by other methods.

One or more of these scores may be used to determine a total score for a particular venue. In one embodiment, what scores that are used may be defined by the user within an interface of a mobile device application. In one embodiment, one or more scores are combined to determine a combined score for each venue within the result set. Optionally, the combined score for each venue may be adjusted based on one or more venue factors (e.g., at block 407). For instance, if the venue is not currently open at the time of day the search is executed, the score of that venue may be reduced so that the venue is not highly recommended. Further, if the venue location is currently popular or many people are checked-in to the venue, the score for that particular venue may be adjusted upward. According to one embodiment, different methods of scoring may be used alone or in combination to determine a combined score. At block 408, the set of combined scores for each venue may be provided as an output to a mobile device application, system or other entity. The receiving entity may then rank and output the venues based on the combined score at block 409. At block 410, process 400 ends.

According to one aspect, it is appreciated that higher quality venues are desired for presentation to users. According to one embodiment, one or more factors may be used alone or in combination with other factors to determine the quality of a particular venue. As discussed, it is desired that a signal indicative of the best venues would be helpful in the creation and display of a list to a user (e.g., particularly one of a location-based service that has limited display capability and/or needs to provide a limited number of recommendations). Thus, a method of ranking may be desired that provides a high-precision ranking of the "best" venues, but not necessarily a ranking of all venues, which might be typically returned in an Internet search.

In one embodiment, it is appreciated that a factor that is derived from a list of venues and how they are arranged may be used as an indicator of the level of quality of a particular venue. In one implementation of a location-based service, users are permitted to create "lists" of venues. For instance, in one implementation of a location-based service, a list of venues may be created by a particular user and shared with other users. Users may "follow" other users and/or lists, may have lists recommended to them based on their associations with other users, their venue history, or may have lists presented to them based on other criteria.

In one aspect, it is appreciated that higher quality venues are contained by more lists followed by more influential users and created by more influential users of the location-based service than "average" venues. Thus, in one implementation, a score may be determined, at least in part, based on the number of times that a particular venue appears within lists of these influential users. Because multiple lists may be used to determine a score, a single powerful list may not necessarily dominate the score.

According to one embodiment, a process may be performed to determine a score for a particular venue location based on a reputation score for a particular user. One example process includes the following:

Wherein the expression $rep(user_i)$=reputation score for $user_i$

In one embodiment, a venue score (VenueListScore) may be determined according to the following:

$$\begin{aligned}
\text{VenueListScore} = \\
\quad \text{sum for each list } L_i \text{ that contains a venue:} \\
\quad \text{rep(author of Li)} * \\
\quad \text{sum for follower } F_j \text{ of list } L_i \\
\quad \quad \text{cred}(F_j) \, / \, \text{count(lists } F_j \text{ follows)}
\end{aligned}$$

Where rep(author of Li) is a reputation score for the "author" or creator of the list of venues within the location-based service. The expression $[\text{cred}(F_j)/\text{count}(\text{lists } F_j \text{ follows})]$ accounts for users who follow many lists. According to this expression, the credibility as calculated for a particular user is spread evenly over the lists that the user follows, so that an influential user that follows many lists may not dominate any one particular list.

According to another embodiment, it is appreciated that a factor that is derived from a measurement of how "expert" users view the venue may be used to determine the quality of that venue. In one implementation, there may be a ranking or scoring that is indicative of how popular a particular venue is with "expert" users within a particular venue category. For instance, do people who often go to coffee places (e.g., a coffee expert) go to this particular coffee place? In one implementation, expertise may be measured by a total activity in the category. For instance, a user's expertise in the category may be determined based on, for example, the number of check-ins, the number of venues checked into, tips left for venues in the category, photos taken, among other actions performed with respect to one or more venues in that category. Expertise may also be determined for a particular user based on geographic area or location.

In one embodiment, an "ExpertRank" function may be used by the location-based system to determine, for each user and category pair, how "expert" that user is in that category.

For instance, in one implementation, the score may be determined as a linear combination of at least one or more of the following parameters:
- a number of check-ins by the user in that category
- a number of distinct venues checked into by the user that category
- a number of tips left by the user in that category
- a number of tips the user has "left" that other users have "done" in that category According to one implementation, these amounts may be weighted to determine an optimal score that reflects a user's expertise. Although the weights may be determined manually, it should be understood that the weights could be tuned (e.g., by a knowledge-based system) using a set of training examples of known users that are determined experts in certain categories.

Thus, in one example, there is one particular user that loves coffee, and has been to 40 distinct coffee places (venues), many of them the user has frequented dozens of times. Also, in the example, the user has left many tips, and many other users have completed these defined tips. Thus, that user may be given a high expertise score for the category "coffee" based on the interactions with the location-based service.

In another embodiment, it is appreciated that a factor that is derived from a user sentiment regarding certain venues in the location-based service may be used as an indication of the level of quality of a particular venue. For instance, the location-based service may analyze information left by users for a particular venue (e.g., "tips" left by users that describe the quality of the venue) to determine whether the sentiment relating to the venue is positive or negative. In one implementation, venues having more positive sentiment may be scored or ranked higher than those having negative sentiment.

In one embodiment, an "SentimentRank" function may be used by the location-based system to determine whether an overall sentiment about a venue is positive or negative (or other ranking or scoring factor type). According to one implementation, the function may be executed on "tips" or other feedback left by users for a particular venue. In the case of textual-based feedback, a keyword analysis may be used to determine whether the feedback is positive or negative. In one implementation, venues having a more positive score may be adjusted in the ranking, or their ranking or score may be adjusted. For example, a tip similar to "Best Mexican food in the city—I loved it!" is very positive, so that venue may be adjusted upward. A tip similar to "Terrible service, long lines." is negative, so the ranking of the venue may be adjusted downward. A tip similar to "Slow, but very tasty" has mixed sentiment and may have a neutral or slightly higher or lower adjustment affect.

An overall score for the venue may be determined, in one embodiment, by determining a sum of the sentiment on all of the tips or other feedback left by users for the particular venue. It is appreciated that in some location-based systems, some venues may have hundreds of tips, and therefore, this feedback may be highly indicative of the sentiment for a particular venue.

Sentiment or any of the above factors such as popularity may also be adjusted based on time. For instance, tips given two years ago may have less weight than a tip given more previously. In another example, scores may be adjusted based on the on time of day or day of week. In one implementation, one or more of the scores or rankings of a particular venue (e.g. venue popularity) may be based on historic check-ins in a particular defined period of time (e.g., performing a check-in within each hour of the week). Such tracking of scores in different time periods allows a location-based service to provide more granular time-based recommendations. For instance, a location-based service may determine that a particular venue may be most popular on Friday and Saturday nights after 10 pm. Other types of ranking or scores may be tracked in this manner. For example, check-in popularity, popularity with "friends" defined in a social network, popularity relative to a category, popularity relative to a neighborhood, may be determined based on time period according to various embodiments.

According to another aspect of the present invention, a location-based system may determine an adjustable boundary of a geographical area in which to search for venues based on a query (e.g., a query provided by a user within an interface of a mobile device). According to one embodiment, the boundary of search may be adjusted based on the density of venues within a particular area. For instance, from a particular geographic point, a radius from the geographic point may be adjusted to achieve a particular venue density within a circular area. Although a circle may be used, other boundary types and shapes may be used (e.g., square, rectangle, displayed map area, town, or similar boundary).

In another embodiment, the adjustable boundary may be determined based on a distance between subsequent "check-ins" in an area by users in that particular area in relation to some time. For instance, a determination may be made by the location-based system that a user checked in a certain distance from one check-in location point (e.g., a first venue) to a second check-in location point (e.g., a second venue). In one implementation, an average distance between check-in points (e.g., from one user, all users) may be used as an input to determine an adjustment of an adjustable boundary used for executing a search query for venue locations.

Such a search query may be time-dependent, in that the average distance may be computed for different time periods and the adjustable boundary may be modified according to the different periods. For instance, a search result returned by a location-based service based on a search for "pharmacies" at 3 AM may have a wider geographic search result than a similar search performed at 3 PM, if it is based on the number of check-in density and/or average distance between check-ins during the 3 AM period is much less than that at 3 PM. In a similar way, queries of areas having little check-in activity (and perhaps fewer venues defined) may use a wider geographic search.

According to another aspect, it is appreciated that the check-in history may be used as an indicator of the activity density within a particular region. In one implementation, check-in history may be used to determine a default or adjustable setting for performing a search query (e.g., as a setting in a location-based application operated by a user). In one embodiment, the boundary information may be used as a limiting parameter on a search query that is performed to limit a number of returned venues.

It should be appreciated that any of the above ranking/scoring methods may be used either alone or in combination with any other ranking and/or scoring methods.

Example Interfaces

Figure 5:
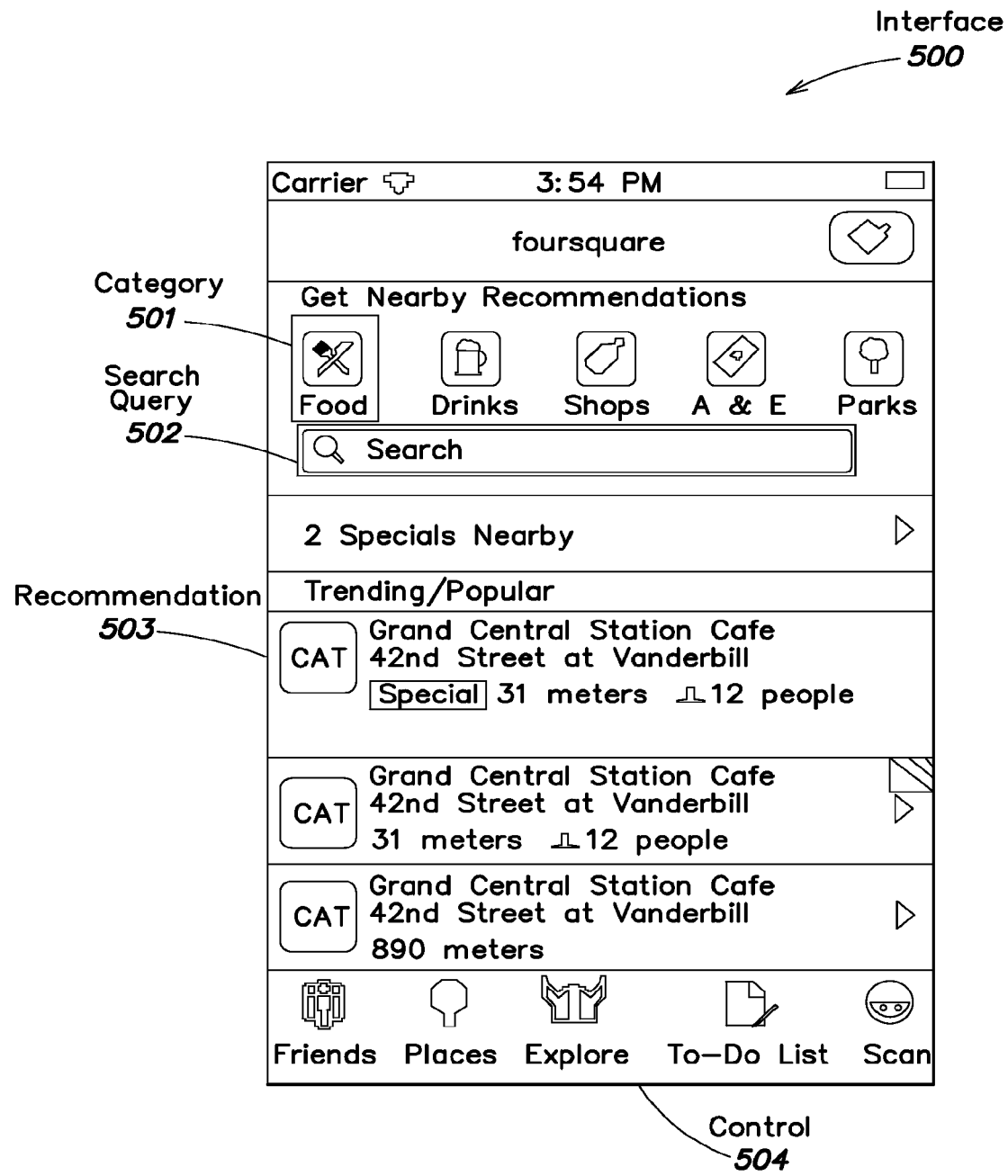
FIG. 5 shows an example interface in which recommendations may be provided according to one embodiment of the present invention.

FIG. 5 shows one example interface in which recommendations may be provided according to one embodiment of the present invention. In particular, and interface 500 may be provided that shows one or more recommendations (e.g., recommendation 503) responsive to a user searching for one or more venues. In one embodiment, an "Explore" control (e.g., control 504) is presented within an interface of the location-based system (e.g., an interface of a mobile device) that allows the user to search and view recommendations for particular venues.

In one embodiment, interface 500 may include one or more categories (e.g., category 501) that may permit the user to identify venues associated with these categories. For instance, example categories may include food, drinks, shops, art and entertainment (A&E), parks, among other possible categories that may be defined based on venues.

According to one embodiment, interface 500 may include a search query area 502 where users may enter text based search queries. Further, interface 500 may include a control, when activated, executes a search of venues according to various embodiments as discussed above. In another embodiment, a search query is executed as information is entered and/or changed by the user. Such a search query may be responsive to one or more controls or one or more query inputs to limit a number of returned venues.

Responsive to users selecting one or more categories and/or entering information within search query area 502, one or more recommendations may be shown to the user within a recommendation area within the display. In one embodiment, interface 500 may include a "trending" area that shows venues where check-in activity is increasing. As discussed above, one or more recommendations may be ranked and/or scored using the various methods described above, either alone or in combination, and the recommendations may be arranged within the interface (interface 500) responsive to these determined ranks or scores.

Figure 6:
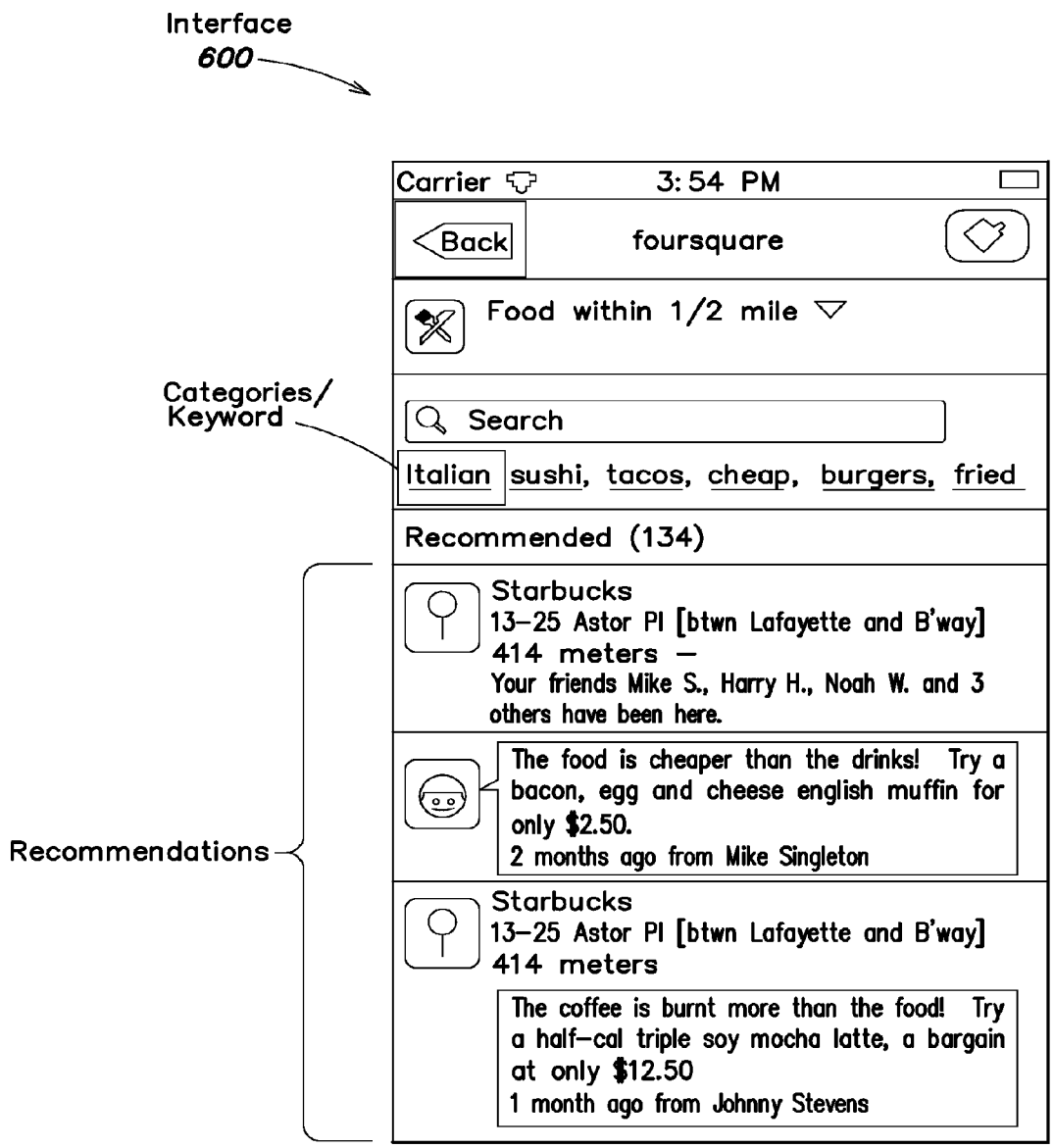
FIG. 6 shows an example interface within a particular venue category according to one embodiment of the present invention.

FIG. 6 shows an example interface within a particular venue category according to one embodiment of the present invention. In particular, interface 600 may be displayed to a user, for instance, after the user selects one or more categories (e.g. food). Interface 600 may include further categories/keywords (e.g. categories/keywords 601) that permits the user to further narrow the category of venues to be searched. In one embodiment, such categories or keywords may be extracted from information defined within the venues defined within the location-based service. Such information may include, for example, descriptions of the venues, any feedback (e.g., tips) for the venue, any tags or other defining information for the venue. Such categories/keywords that may be used to narrow the search may change based on popularity, location, frequency of search and/or any other parameter that permits the user to find the necessary venues.

Interface 600 may also include a recommendations area 602 wherein various recommendations are displayed corresponding to search criteria, location of the user, personal information of the user, social relations of the user, popularity, among other criteria. According to one embodiment of the present invention, within each of the recommendations provided to the user, a justification (e.g., justification 603) may be displayed that indicates to the user why a particular recommendation was provided. For instance in the example shown, a suitable justification may include "Your friend Mike S, Harry H, Noah W, and three others have been here." Therefore, rather than merely providing search results, the location-based system may provide additional information regarding the recommendation that might trigger a user to adopt the recommendation. For instance, if the user perceives that Mike S. has similar tastes, the user may be inclined to review and/or adopt the recommendation.

Further, in one embodiment, interface 600 may include an area where a tip is displayed (e.g., tip area 604). One or more tip information may be chosen by the location-based system to be displayed to the user. This information may be chosen, for instance, based on a social relationship between the user and the user whose tip information is being displayed within the recommendation interface.

Figure 7:
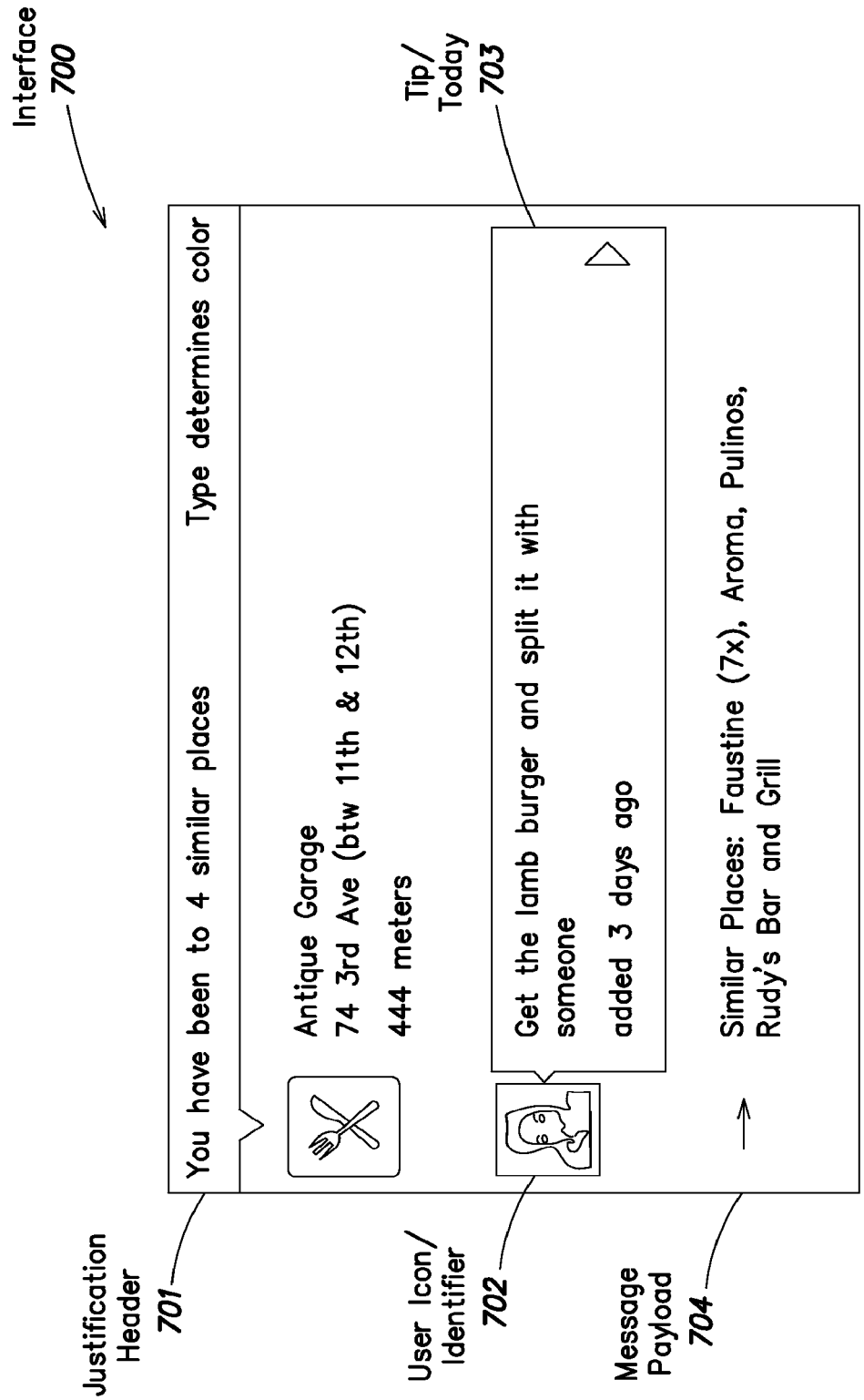
FIG. 7 shows an example interface showing a recommendation and associated justification information according to one embodiment of the present invention.

FIG. 7 shows one example interface showing a recommendation and associated justification information according to one embodiment of the present invention. In particular, interface 700 includes a justification header area 701 that shows a brief description of the justification for the particular recommendation. In one embodiment, the type of justification provided causes the interface to display different type of color to the user, permitting the user to quickly determine a relation of the justification. Interface 700 may also include a user icon or other identifier 702 that identifies a particular user that left the tip (or todo) (e.g., tip/todo 703). Interface 700 may also include other information relating to the recommendation within a message payload area 704. For instance, the location-based service may provide a listing of similar places associated with a particular recommended venue. Any or all of this information may be helpful for the user to determine whether the recommendation should be adopted.

According to one embodiment of the present invention, any number of interfaces having one or more of the above features may be provided to relate recommendation information to the user. For instance, there may be separate areas for showing recommendations based on personal and social justifications, and a separate display area for displaying venues based on a popularity justification. Further, it should be appreciated that more than one justification may be combined to push up the relevancy of a particular venue within a display of recommendations, and multiple recommendations may be displayed within this display.

Example Computer Implementations

Processes described above are merely illustrative embodiments of systems that may provide recommendations in association with a location-based service. Such illustrative embodiments are not intended to limit the scope of the present invention, as any of numerous other implementations for performing the invention. None of the claims set forth below are intended to be limited to any particular implementation of a method of providing player incentives, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. According to one embodiment, the computer-readable medium may be non-transitory in that the computer-executable instructions may be stored permanently or semi-permanently on the medium. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, ARM Cortex processor, Qualcomm Scorpion processor, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

A computer system may be a general-purpose computer system that is programmable using a high-level computer programming language. Computer system may be also implemented using specially programmed, special purpose hardware. In a computer system there may be a processor that is typically a commercially available processor such as the well-known Pentium, Core, Core Vpro, Xeon, or Itanium class processors available from the Intel Corporation. Many other processors are available. Such a processor usually executes an operating system which may be, for example, the Windows NT, Windows 2000 (Windows ME), Windows XP, Windows Vista or Windows 7 operating systems available from the Microsoft Corporation, MAC OS X Snow Leopard, MAC OS X Lion operating systems available from Apple Computer, the Solaris Operating System available from Sun Microsystems, iOS Blackberry OS, Windows 7 Mobile or Android OS operating system or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Further, on each of the one or more computer systems that include one or more components of distributed system 200, each of the components may reside in one or more locations on the system. For example, different portions of the components of system 200 may reside in different areas of memory (e.g., RAM, ROM, disk, etc.) on one or more computer systems. Each of such one or more computer systems may include, among other components, a plurality of known components such as one or more processors, a memory system, a disk storage system, one or more network interfaces, and one or more busses or other internal communication links interconnecting the various components.

Figure 8:
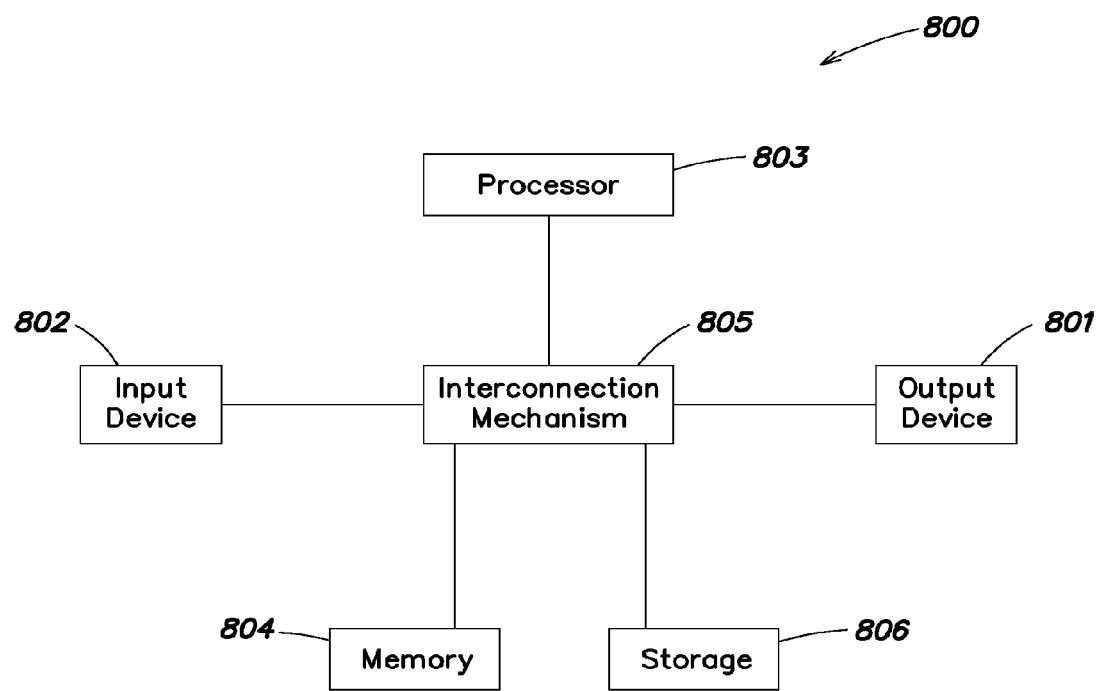
FIG. 8 shows an example computer system with which various aspects of the invention may be practiced.
Figure 9:
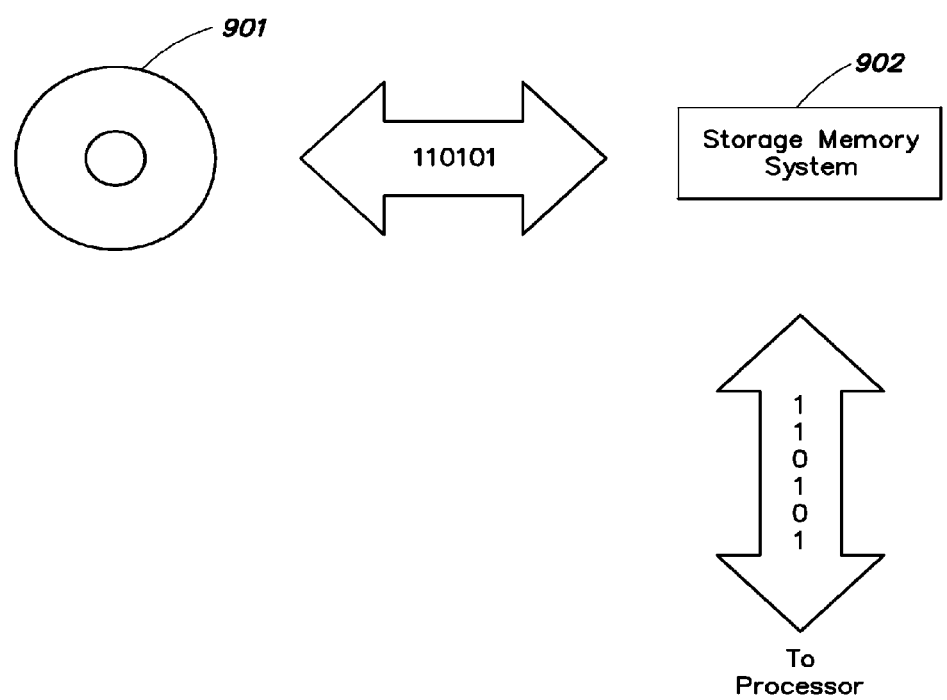
FIG. 9 shows an example storage system capable of implementing various aspects of the present invention.

Any number of systems of distributed system 200 may be implemented on a computer system described below in relation to FIGS. 8 and 9. In particular, FIG. 8 shows an example computer system 800 used to implement various aspects. FIG. 9 shows an example storage system that may be used.

System 800 is merely an illustrative embodiment of a computer system suitable for implementing various aspects of the invention. Such an illustrative embodiment is not intended to limit the scope of the invention, as any of numerous other implementations of the system, for example, are possible and are intended to fall within the scope of the invention. For example, a virtual computing platform may be used. None of the claims set forth below are intended to be limited to any particular implementation of the system unless such claim includes a limitation explicitly reciting a particular implementation.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate integration of the location-based services with the other systems and services according to various embodiments of the invention. Further, the software design system may be located on a single computer or may be distributed among a plurality of computers attached by a communications network.

For example, various aspects of the invention may be implemented as specialized software executing in a general-purpose computer system 800 such as that shown in FIG. 5. The computer system 800 may include a processor 803 connected to one or more memory devices 804, such as a disk drive, memory, or other device for storing data. Memory 804 is typically used for storing programs and data during operation of the computer system 800. Components of computer system 800 may be coupled by an interconnection mechanism 805, which may include one or more busses (e.g., between components that are integrated within a same machine) and/or a network (e.g., between components that reside on separate discrete machines). The interconnection mechanism 805 enables communications (e.g., data, instructions) to be exchanged between system components of system 800. Computer system 800 also includes one or more input devices 802, for example, a keyboard, mouse, trackball, microphone, touch screen, and one or more output devices 801, for example, a printing device, display screen, and/or speaker. In addition, computer system 800 may contain one or more interfaces (not shown) that connect computer system 800 to a communication network (in addition or as an alternative to the interconnection mechanism 805.

The storage system 806, shown in greater detail in FIG. 9, typically includes a computer readable and writeable non-volatile recording medium 901 in which signals are stored that define a program to be executed by the processor or information stored on or in the medium 901 to be processed by the program. The medium may, for example, be a disk or flash memory. Typically, in operation, the processor causes data to be read from the nonvolatile recording medium 901 into another memory 902 that allows for faster access to the information by the processor than does the medium 901. This memory 902 is typically a volatile, random access memory such as a dynamic random access memory (DRAM) or static memory (SRAM). It may be located in storage system 806, as shown, or in memory system 804, not shown. The processor 803 generally manipulates the data within the integrated circuit memory 804, 802 and then copies the data to the medium 901 after processing is completed. A variety of mechanisms are known for managing data movement between the medium 901 and the integrated circuit memory element 804, 902, and the invention is not limited thereto. The invention is not limited to a particular memory system 804 or storage system 806.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 800 is shown by way of example as one type of computer system upon which various aspects of the invention may be practiced, it should be appreciated that aspects of the invention are not limited to being implemented on the computer system as shown in FIG. 8. Various aspects of the invention may be practiced on one or more computers having a different architecture or components that that shown in FIG. 8.

Computer system 800 may be a general-purpose computer system that is programmable using a high-level computer programming language. Computer system 800 may be also implemented using specially programmed, special purpose hardware. In computer system 800, processor 803 is typically a commercially available processor such as the well-known Pentium, Core, Core Vpro, Xeon, or Itanium class processors available from the Intel Corporation. Many other processors are available. Such a processor usually executes an operating system which may be, for example, the Windows NT, Windows 2000 (Windows ME), Windows XP, Windows Vista or Windows 7 operating systems available from the Microsoft Corporation, MAC OS Snow Leopard, MAC OS Snow Lion operating systems available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented using various Internet technologies such as, for example, the well-known Common Gateway Interface (CGI) script, PHP Hyper-text Preprocessor (PHP), Active Server Pages (ASP), HyperText Markup Language (HTML), Extensible Markup Language (XML), Java, JavaScript, Asynchronous JavaScript and XML (AJAX), Flash, and other programming methods. Further, various aspects of the present invention may be implemented in a cloud-based computing platform, such as the well-known EC2 platform available commercially from Amazon.com, Seattle, Wash., among others. Various aspects of the invention may be implemented as programmed or non-programmed elements, or any combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for providing recommendations by a location-based service, the method comprising acts of:
   receiving, within an interface of a mobile device associated with a user, an input defining a query for a recommendation of one or more venue locations by the location-based service;
   determining, by the location-based service, a location of the mobile device;
   determining, a result set of venue locations based on the provided query;
   ordering, within the interface of the mobile device, a plurality of the venue locations of the result set based on at least one or more of a group of venue information comprising:
      personal information associated with the user, the personal information relating to one or more of the plurality of venue locations;
      social network information relating to the one or more of the plurality of venue locations; and
      popularity information that identifies a popularity of the one or more of the plurality of venue locations as determined by a set of users defined in the location-based service; and
   determining, for each of the venue locations in the result set, a respective score based on at least one or more of the group of venue information.

2. A method for providing recommendations by a location-based service, the method comprising acts of:
   receiving, within an interface of a mobile device associated with a user, an input defining a query for a recommendation of one or more venue locations by the location-based service;
   determining, by the location-based service, a location of the mobile device;
   determining, a result set of venue locations based on the provided query;
   ordering, within the interface of the mobile device, a plurality of the venue locations of the result set based on at least one or more of a group of venue information comprising:
      personal information associated with the user, the personal information relating to one or more of the plurality of venue locations;
      social network information relating to the one or more of the plurality of venue locations; and
      popularity information that identifies a popularity of the one or more of the plurality of venue locations as determined by a set of users defined in the location-based service; and
      presenting, to the user in a display of the mobile device associated with the user, an input control in which the user provides one or more keywords.

3. A method for providing recommendations by a location-based service, the method comprising acts of:
   receiving, within an interface of a mobile device associated with a user, an input defining a query for a recommendation of one or more venue locations by the location-based service;
   determining, by the location-based service, a location of the mobile device;
   determining, a result set of venue locations based on the provided query;
   ordering, within the interface of the mobile device, a plurality of the venue locations of the result set based on at least one or more of a group of venue information comprising:
      personal information associated with the user, the personal information relating to one or more of the plurality of venue locations;
      social network information relating to the one or more of the plurality of venue locations; and
      popularity information that identifies a popularity of the one or more of the plurality of venue locations as determined by a set of users defined in the location-based service; and
      presenting, to the user in a display of the mobile device associated with the user, an input control that permits the user to select a category of venues.

4. The method according to claim 1, further comprising an act of providing the user a control that permits the user to select a limitation of a distance from a current location of the user where recommendations will be provided.

5. The method according to claim 1, wherein the personal information relating to one or more of the plurality of venue locations comprises preference information for venues already visited by the user.

6. The method according to claim 1, wherein the personal information relating to one or more of the plurality of venue locations comprises preference information for venues not yet visited by the user.

7. The method according to claim 1, wherein the social network information relating to the one or more of the plurality of venue locations comprises preference information for venues already visited by one or more users in the social network.

8. The method according to claim 1, further comprising an act of determining a popularity measure of the one or more of the plurality of venue locations as determined by the set of users defined in the location-based service.

9. The method according to claim 1, wherein the act of determining, for each of the venue locations in the result set, the respective score based on the at least one or more of the group of venue information further comprises acts of determining respective scores for each venue location in the result set based on more than one of the personal information, the social network information, and the popularity information.

10. The method according to claim 9, further comprising determining scores for each venue location based on the personal information, the social network information, and the popularity information and combining the scores to produce a total score for each venue location.

11. The method according to claim 1, further comprising an act of using a collaborative filtering function for determining the score of each venue locations in the result set using at least one or more of the group of venue information.

12. The method according to claim 1, further comprising an act of using a user-user filtering function for determining the score of each venue locations in the result set using at least one or more of the group of venue information.

13. The method according to claim 1, further comprising an act of using a k-nearest neighbors filtering function for determining the score of each venue locations in the result set using at least one or more of the group of venue information.

14. The method according to claim 1, further comprising an act of adjusting the respective score for at least one of the venue locations in the result set responsive to one or more factors relating to the at least one of the venue locations.

15. The method according to claim 14, wherein the one of more factors includes at least one of a probability that the at least one of the venue locations is currently open and information identifying that the at least one of the venue locations is currently being frequented.

16. The method according to claim 1, wherein the act of ordering the plurality of venue locations is responsive to a determination of popularity of each of the plurality of venue locations, the determination of popularity for a respective one of the plurality of venue locations being based on whether the respective one venue appears on a list of venues.

17. The method according to claim 1, wherein the act of ordering the plurality of venue locations is responsive to a determination of popularity of each of the plurality of venue locations, the determination of popularity for a respective one of the plurality of venue locations being based on how popular the respective one venue is with one or more experts.

18. The method according to claim 17, further comprising an act of determining the one or more experts based on their activity within the location-based service.

19. The method according to claim 1, wherein the act of ordering the plurality of venue locations is responsive to a determination of sentiment of each of the plurality of venue locations.

20. The method according to claim 19, wherein the determination of sentiment comprises an act of determining, for at least one venue of the plurality of venue locations, an indication of sentiment based on review information provided by users for the at least one venue to the location-based service.

21. The method according to claim 1, further comprising an act of limiting the result set of venue locations responsive to a determination of densities of venues in a particular area.

22. The method according to claim 1, further comprising an act of limiting the result set of venue locations responsive to a determination of a distance between subsequent check-ins in a particular area.

23. The method according to claim 22, further comprising an act of determining the distance between subsequent check-ins for a plurality of users within the particular area.

24. A system for providing recommendations in a distributed communications network, the system comprising:
   a location-based service including a distributed computer system having at least one processor and a memory;
   an interface adapted to receive an input from a mobile device defining a query for a recommendation of one or more venue locations by the location-based service;
   a component for determining, by the location-based service, a location of the mobile device;
   a component adapted to determine a result set of venue locations based on the provided query;
   a component adapted to order, within the interface of the mobile device, a plurality of the venue locations of the result set based on at least one or more of a group of venue information comprising:
      personal information associated with the user, the personal information relating to one or more of the plurality of venue locations;
      social network information relating to the one or more of the plurality of venue locations; and
      popularity information that identifies a popularity of the one or more of the plurality of venue locations as determined by a set of users defined in the location-based service; and
   a component adapted to determine, for each of the venue locations in the result set, a respective score based on at least one or more of the group of venue information.

25. A system for providing recommendations in a distributed communications network, the system comprising:
   a location-based service including a distributed computer system having at least one processor and a memory;
   an interface adapted to receive an input from a mobile device defining a query for a recommendation of one or more venue locations by the location-based service;
   a component for determining, by the location-based service, a location of the mobile device;
   a component adapted to determine a result set of venue locations based on the provided query;
   a component adapted to order, within the interface of the mobile device, a plurality of the venue locations of the result set based on at least one or more of a group of venue information comprising:
      personal information associated with the user, the personal information relating to one or more of the plurality of venue locations;
      social network information relating to the one or more of the plurality of venue locations; and
      popularity information that identifies a popularity of the one or more of the plurality of venue locations as determined by a set of users defined in the location-based service; and
   a component adapted to present, to the user in a display of the mobile device associated with the user, an input control in which the user provides one or more keywords.

26. A system for providing recommendations in a distributed communications network, the system comprising:
   a location-based service including a distributed computer system having at least one processor and a memory;
   an interface adapted to receive an input from a mobile device defining a query for a recommendation of one or more venue locations by the location-based service;
   a component for determining, by the location-based service, a location of the mobile device;
   a component adapted to determine a result set of venue locations based on the provided query;
   a component adapted to order, within the interface of the mobile device, a plurality of the venue locations of the result set based on at least one or more of a group of venue information comprising:
      personal information associated with the user, the personal information relating to one or more of the plurality of venue locations;
      social network information relating to the one or more of the plurality of venue locations; and
      popularity information that identifies a popularity of the one or more of the plurality of venue locations as determined by a set of users defined in the location-based service; and
   a component adapted to present, to the user in a display of the mobile device associated with the user, an input control that permits the user to select a category of venues.

27. The system according to claim 24, further comprising a control that permits the user to select a limitation of a distance from a current location of the user where recommendations will be provided.

28. The system according to claim 24, wherein the personal information relating to one or more of the plurality of venue locations comprises preference information for venues already visited by the user.

29. The system according to claim 24, wherein the personal information relating to one or more of the plurality of venue locations comprises preference information for venues not yet visited by the user.

30. The system according to claim 24, wherein the social network information relating to the one or more of the plurality of venue locations comprises preference information for venues already visited by one or more users in the social network.

31. The system according to claim 24, further comprising a component adapted to determine a popularity measure of the one or more of the plurality of venue locations as determined by the set of users defined in the location-based service.

32. The system according to claim 24, wherein the component that is adapted to determine, for each of the venue locations in the result set, the respective score based on the at least one or more of the group of venue information further comprises a component adapted to determine respective scores for each venue location in the result set based on more than one of the personal information, the social network information, and the popularity information.

33. The system according to claim 32, further comprising a component adapted to determine scores for each venue location based on the personal information, the social network information, and the popularity information and combining the scores to produce a total score for each venue location.

34. The system according to claim 24, further comprising a component adapted to perform a collaborative filtering function for determining the score of each venue locations in the result set using at least one or more of the group of venue information.

35. The system according to claim 24, further comprising a component adapted to perform a user-user filtering function for determining the score of each venue locations in the result set using at least one or more of the group of venue information.

36. The system according to claim 24, further comprising a component adapted to perform a k-nearest neighbors filtering function for determining the score of each venue locations in the result set using at least one or more of the group of venue information.

37. The system according to claim 24, further comprising a component adapted to adjust the respective score for at least one of the venue locations in the result set responsive to one or more factors relating to the at least one of the venue locations.

38. The system according to claim 37, wherein the one of more factors includes at least one of a probability that the at least one of the venue locations is currently open and information identifying that the at least one of the venue locations is currently being frequented.

39. The system according to claim 24, wherein the component adapted to order the plurality of venue locations is responsive to a component adapted to determine a popularity of each of the plurality of venue locations, the popularity for a respective one of the plurality of venue locations being based on whether the respective one venue appears on a list of venues.

40. The system according to claim 24, wherein the component adapted to order the plurality of venue locations is responsive to a component adapted to determine a popularity of each of the plurality of venue locations, the popularity for a respective one of the plurality of venue locations being based on how popular the respective one venue is with one or more experts.

41. The system according to claim 40, further comprising a component adapted to determine the one or more experts based on their activity within the location-based service.

42. The system according to claim 24, wherein the component adapted to order the plurality of venue locations is responsive to a component adapted to determine sentiment of at least one of the plurality of venue locations.

43. The system according to claim 42, wherein the component adapted to determine sentiment comprises a component adapted to determine, for at least one venue of the plurality of venue locations, an indication of sentiment based on review information provided by users for the at least one venue to the location-based service.

44. The system according to claim 24, further comprising a component adapted to limit the result set of venue locations responsive to a determination of densities of venues in a particular area.

45. The system according to claim 24, further comprising a component adapted to limit the result set of venue locations responsive to a determination of a distance between subsequent check-ins in a particular area.

46. The system according to claim 45, further comprising a component adapted to determine the distance between subsequent check-ins for a plurality of users within the particular area.

* * * * *